US008606725B1

(12) United States Patent
Agichtein et al.

(10) Patent No.: US 8,606,725 B1
(45) Date of Patent: Dec. 10, 2013

(54) AUTOMATIC CLIENT-SIDE USER-BEHAVIOR ANALYSIS FOR INFERRING USER INTENT

(75) Inventors: Yevgeny Agichtein, Atlanta, GA (US); Qi Guo, Atlanta, GA (US); Phillip Wolff, Decatur, GA (US)

(73) Assignee: Emory University, Atlanta, GA (US)

( * ) Notice: Subject to any disclaimer, the term of this patent is extended or adjusted under 35 U.S.C. 154(b) by 857 days.

(21) Appl. No.: 12/608,965

(22) Filed: Oct. 29, 2009

Related U.S. Application Data

(60) Provisional application No. 61/109,261, filed on Oct. 29, 2008.

(51) Int. Cl.
*G06F 15/18* (2006.01)

(52) U.S. Cl.
USPC .......................................................... 706/12

(58) Field of Classification Search
USPC .......................................................... 706/12
See application file for complete search history.

(56) References Cited

U.S. PATENT DOCUMENTS

| | | | | |
|---|---|---|---|---|
| 6,583,781 | B1 * | 6/2003 | Joshi et al. ..................... | 345/156 |
| 8,219,406 | B2 * | 7/2012 | Yu et al. ......................... | 704/275 |
| 2004/0205182 | A1 * | 10/2004 | Geddes ........................ | 709/223 |
| 2008/0003559 | A1 * | 1/2008 | Toyama et al. ................ | 434/350 |
| 2009/0024461 | A1 * | 1/2009 | Willner et al. ................... | 705/14 |
| 2009/0037355 | A1 * | 2/2009 | Brave et al. ..................... | 706/45 |
| 2010/0131835 | A1 * | 5/2010 | Kumar et al. ................... | 715/205 |

OTHER PUBLICATIONS

Guo, Q. et al. "Exploring Client-Side Instrumentation for Personalized Search Intent Inference: Preliminary Experiments". ITWP20008, 6th Workshop on Intelligent Techniques for Web Personalization & Recommender Systems, AAAI 2008. Jul. 13, 2008. Chicago, Illinois, USA. pp. 10-19.*

Chen, M-C, et al. "What can a mouse cursor tell us more? Correlation of eye/mouse movements on web browsing". Proceeding CHI '01 extended abstracts on Human factors in computing systems. pp. 281-282. ACM. 2001. DOI: 10.1145/634067.634234.*

Saund, E. et al. "Stylus Input and Editing Without Prior Selection of Mode". UIST'03. Proceedings of the 16th annual ACM symposium on User interface software and technology. pp. 213-216. ACM. 2003. DOI: 10.1145/964696.964720.*

(Continued)

*Primary Examiner* — Jeffrey A Gaffin
*Assistant Examiner* — Benjamin Buss
(74) *Attorney, Agent, or Firm* — Emory Patent Group; Randi Beth Isaacs; Susanne Hollinger

(57) ABSTRACT

User intent may be inferred from mouse movements made within a user interface. Client-side instrumentation may be provided that collects mouse movement data that is provided to a classification engine. The classification engine receives the mouse movement data and creates a mouse trajectory. The mouse trajectory may be split into segments, and features associated with each segment may be determined. Features representing the context of the search, that is, content of the search result page, previous queries submitted, and interaction features such as scrolling, may be included. By examining the features associated with the mouse trajectories within the context of a search session, the user intent may be classified into categories using machine learning classification techniques. By inferring user intent, Web search engines may be able to predict whether a user's intent is commercial and tailor advertising accordingly.

17 Claims, 11 Drawing Sheets

(56) References Cited

OTHER PUBLICATIONS

Goldberg, J.H. et al. "Eye-gaze determination of user intent at the computer interface". Presented at the 7th European Eye Movement Conference, Durham, England, 1993. 17 pages.*

Guo, Q. et al. "Understanding 'Abandoned' Ads: Towards Personalized Commercial Intent Inference via Mouse Movement Analysis". SIGIR-IRA, Jul. 2008.*

Atterer, R. et al. "Knowing the users every move: user activity tracking for website usability evaluation and implicit interaction", Proceedings of the 15th international conference on World Wide Web, May 23-26, 2006. pp. 203-212. doi:10.1145/1135777.1135811.*

Dai, H. et al. "Detecting Online Commercial Intention (OCI)." Proceedings of the 15th International Conference on World Wide Web, pp. 829-837, 2006.*

Arroyo, E. et al. "Usability tool for analysis of web designs using mouse tracks", CHI '06 extended abstracts on Human factors in computing systems, Apr. 22-27, 2006. pp. 484-489. doi:10.1145/1125451.1125557.*

Leiva Torres, L. A., and R. V. Hernando. "Real time mouse tracking registration and visualization tool for usability evaluation on websites." Proceedings of the IADIS international conference WWW/Internet. 2007. 14 pages.*

* cited by examiner

AUTOMATIC CLIENT-SIDE USER-BEHAVIOR ANALYSIS FOR INFERRING USER INTENT

CROSS-REFERENCE TO RELATED APPLICATION

The present disclosure claims the benefit of priority to U.S. Provisional Application No. 61/109,261, filed Oct. 29, 2008, which is incorporated herein by reference in its entirety.

BACKGROUND

Advertisers try to distinguish between users who are browsing and those that are searching for goods and services. Users searching for specific goods and services may be responsive to targeted, contextual advertising, while those browsing without specific commercial goal may be targeted in other ways. However, it is difficult to understand the user's mindset in the online environment, which makes it difficult for advertisers to choose the most appropriate type of targeting for their advertising campaigns.

Web search engines typically are the starting point from which users begin their browsing for goods and services. Advertisers seek to take advantage of this and may pay for selected keywords that are correlated to advertising campaigns. As such, certain advertising may be displayed in response to the keywords being entered within a user's search query. In order to determine the success of an advertising campaign, a click through rate may be determined that represents the number of times an ad is clicked divided by the number of times the ad is shown. Higher click through rates are indicative of a successful advertising campaign, whereas lower click through rates may be indicative of a poor campaign that is not targeted at the correct user base.

While valuable, click through rates do not tell the whole story of the user's interaction with the search results page. For example, they do not indicate why the user clicked on a particular result, or which other results they considered, and did not click, before making a choice. These "abandoned," un-clicked ads are highly indicative of user intent, however, click through rates and other measurement techniques cannot quantify user interests from un-clicked advertisements.

SUMMARY

User intent may be inferred from observed mouse movements made within a user interface. Mouse movements may be tracked during user interaction sessions to determine the intent behind, e.g., a search query. Client-side instrumentation may be provided that collects mouse movement data that is provided to a classification engine. The classification engine receives the mouse movement data and creates a mouse trajectory. The mouse trajectory may be analyzed to determine discrete features, such as a trajectory length, a vertical range, or a horizontal range. In addition, the mouse trajectory may be split into segments, and features associated with each segment, such as an average speed, and its average duration, a slope, and a rotation angle may be determined. Different classes of intent may be defined to distinguish user intent, such as navigational vs. informational queries, commercial vs. non-commercial searches, etc.

In some implementations, the mouse movement data may be used to determine and classify cognitive abilities of the user and provide useful diagnostic information about the user.

In some implementations, the determined state of mind, user intent, or cognitive abilities may be used to adapt a user interface in which information is presented to the user by, e.g., rearranging information, re-ranking results, and/or by providing more relevant information or results.

The foregoing is a summary and thus contains, by necessity, simplifications, generalizations, and omissions of detail. Those skilled in the art will appreciate that the summary is illustrative only and is not intended to be in any way limiting.

DETAILED DESCRIPTION

Figure 1:
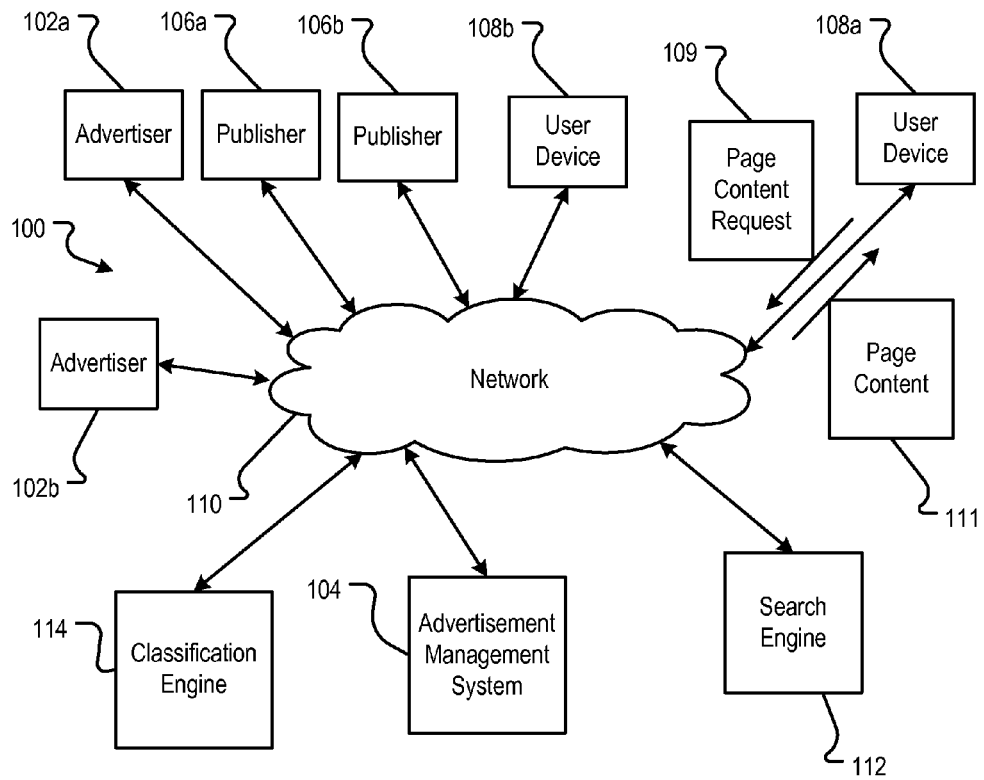
FIG. 1 shows a block diagram of an exemplary online environment.

In accordance with implementations disclosed herein, FIG. 1 is a block diagram of an example online environment 100. The online environment 100 may facilitate the identification and serving of content items, e.g., web pages, advertisements, etc., to users. A computer network 110, such as a local area network (LAN), wide area network (WAN), the Internet, or a combination thereof, connects advertisers 102a and 102b, an advertisement management system 104, publishers 106a and 106b, user devices 108a and 108b, and a search engine 112. Although only two advertisers (102a and 102b), two publishers (106a and 106b), and two user devices (108a and 108b) are shown, the online environment 100 may include many thousands of advertisers, publishers, and user devices.

In some implementations, one or more advertisers 102a and/or 102b may directly or indirectly enter, maintain, and track advertisement information in the advertising management system 104. The advertisements may be in the form of graphical advertisements, such as banner advertisements, text only advertisements, image advertisements, audio advertisements, video advertisements, advertisements combining one of more of any of such components, etc., or any other type of electronic advertisement document.

A user device, such as user device 108a, may submit a page content request 109 to a publisher or the search engine 112 using a web browser application running on the user device 108a. In some implementations, the page content 111 may be provided to web browser running on the user device 108a in response to the request 109. The page content may include advertisements provided by the advertisement management system 104. Example user devices 108 include personal computers (PCs), mobile communication devices, television settop boxes, etc. The user device 108*a* is described in more detail below with reference to FIG. 11.

Advertisements may also be provided from the publishers 106. For example, one or more publishers 106*a* and/or 106*b* may submit advertisement requests for one or more advertisements to the system 104. The system 104 responds by sending the advertisements to the requesting publisher 106*a* or 106*b* for placement on one or more of the publisher's web properties (e.g., websites and other network-distributed content).

Advertisements may also be provided through the use of the search engine 112. The search engine 112 may receive queries for search results. In response, the search engine 112 may retrieve relevant search results from an index of documents (e.g., from an index of web pages). Search results may include, for example, lists of web page titles, snippets of text extracted from those web pages, and hypertext links to those web pages, and may be grouped into a predetermined number of (e.g., ten) search results.

The search engine 112 may also submit a request for advertisements to the system 104. The request may include a number of advertisements desired. This number may depend on the search results, the amount of screen or page space occupied by the search results, the size and shape of the advertisements, etc. The request for advertisements may also include the query (as entered or parsed), information based on the query (such as geo-location information, whether the query came from an affiliate and an identifier of such an affiliate), and/or information associated with, or based on, the search results. Such information may include, for example, identifiers related to the search results (e.g., document identifiers or "docIDs"), scores related to the search results (e.g., information retrieval ("IR") scores), snippets of text extracted from identified documents (e.g., web pages); full text of identified documents, feature vectors of identified documents, etc. In some implementations, IR scores may be computed from, for example, dot products of feature vectors corresponding to a query and a document, page rank scores, and/or combinations of IR scores and page rank scores, etc.

The search engine 112 may combine the search results with one or more of the advertisements provided by the system 104. This combined information may then be forwarded to the user device 108*a* that requested the content as the page content 111 to be displayed in the web browser running on the user device 108*a*. The search results may be maintained as distinct from the advertisements, so as not to confuse the user between paid advertisements and presumably neutral search results.

The advertisers 102, user devices 108, and/or the search engine 112 may also provide usage information to the advertisement management system 104. This usage information may include measured or observed user behavior related to advertisements that have been served, such as, for example, whether or not a conversion or a selection related to an advertisement has occurred.

In some implementations, the observed user behavior may include determining or inferring user intent by tracking mouse movements. Mouse movements may be tracked during user interaction sessions to determine the intent behind, e.g., a search query. The mouse movement data may be forwarded to a classification engine 114 that applies machine learning classification techniques to the mouse movement data to classify and determine the user's intent or state of mind. Different classes of intent may be defined to distinguish user intent, such as navigational vs. informational queries, commercial vs. non-commercial searches, etc. Yet further, the mouse movement data may be used to determine and classify cognitive abilities of the user and provide useful diagnostic information about the user. Still further, the determined state of mind, user intent, or cognitive abilities may be used to adapt a user interface in which information is presented to the user by, e.g., rearranging information, re-ranking results, and/or by providing more relevant information or results.

Figure 2:
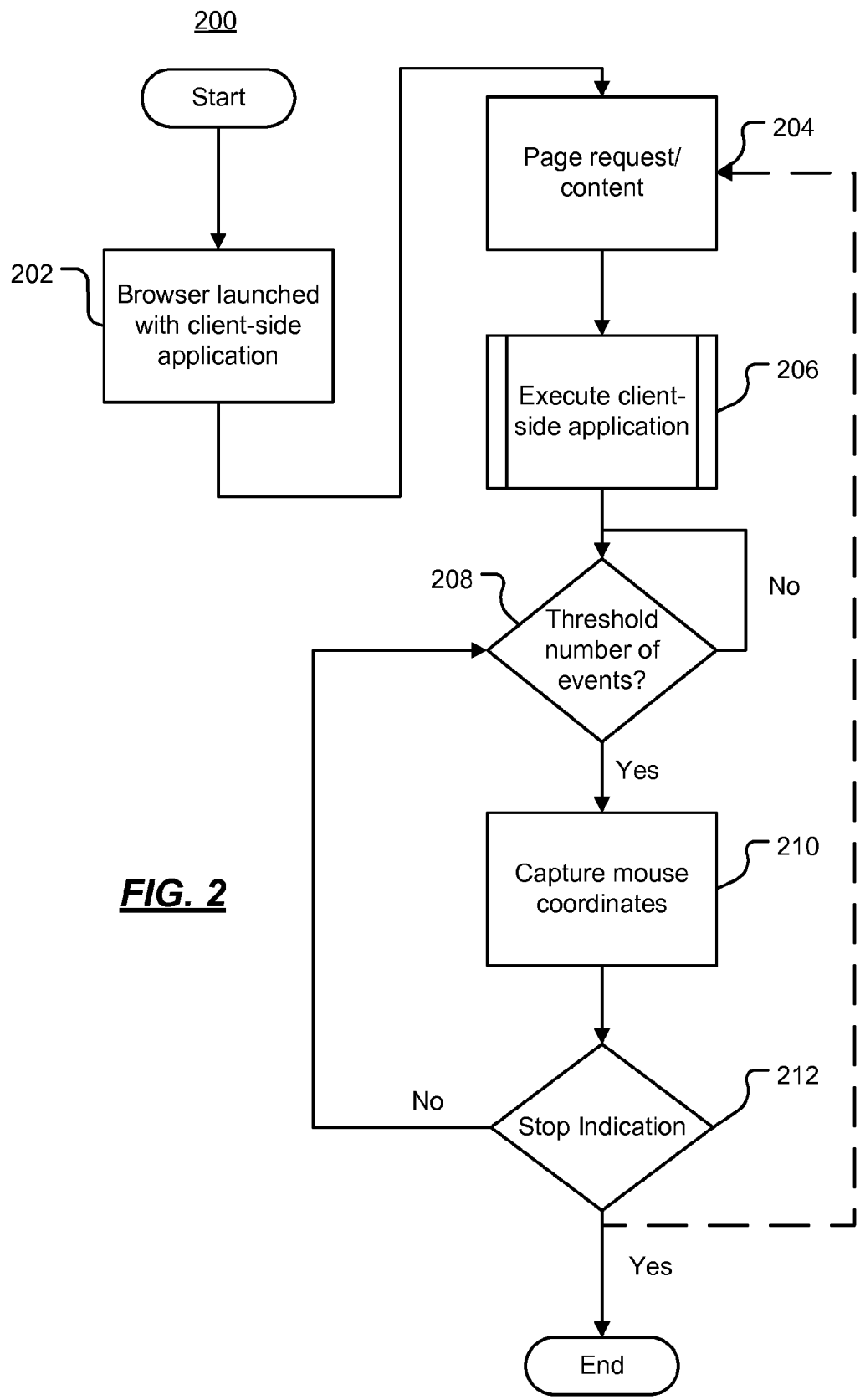
FIG. 2 illustrates an operational flow of a process to capture mouse movements.

Referring to FIG. 2, there is illustrated an operational flow of a process 200 to capture mouse movements. At 202, a browser is launched having a client-side data gather application. In some implementations, JavaScript code may be included into a toolbar loaded as the browser launches to track the user behavior of searching and browsing. For example, a LibX toolbar may be loaded as a library-specific extension for the Firefox and Internet Explorer browsers to enables users to search and use services offered by libraries.

In some implementations, the JavaScript instrumentation code may be downloaded automatically by including it with the content returned to the browser. This implementation does not require a toolbar application to be downloaded and installed as part of the web browser.

In some implementations, the client-side data gathering application may be a Java applet, Active Server Page (ASP), .Net, or ActiveX control downloaded to the browser from the server.

At 204, a page request is made and content received. This may occur when the user enters a Uniform Resource Locator (URL) into an address bar of the browser, selects a bookmark/favorite, enters a search string into the toolbar, or enters a search string into a text box on a displayed web page. The request is made to a target web server or service (e.g., search server 112) when the user presses an enter key on the keyboard, clicks a search button, or clicks a "go" arrow provided on the browser navigation controls. Content may be received from the web server or service as web pages, search results, advertisements, etc.

At 206, the client-side application executes to gather data about a user's interaction with the returned content. For example, the JavaScript code may sample events such as mouse movements on a web search result page. An on Mousemove event is fired each time a user moves the mouse one pixel. Mouse movements may be sampled by capturing the mouse coordinates as the on Mousemove events are fired. Additional events such as page scroll, mouseDown, mouseUp, etc. are also captured.

At 208, it is determined if a threshold number of events has been sampled. For example, the JavaScript code may capture the user's mouse coordinates at every one out of ten on Mousemove events (however, if the user moves the mouse too fast, ten on Mousemove events may result in a trajectory of more than ten pixels). Other movement amounts may be specified in accordance with on Mousemove events.

If the threshold number of events has been reached, then the mouse coordinates may be captured at 210 as mouse movement data. For example, the mouse movement data (events) may be encoded in a string stored in a buffer on the user device 108*a*. Once the buffer is filled, the string may be forwarded to the classification engine 114 for classification of the mouse movement data. If the threshold has not been reached, then the process loops back to 208.

At 212, it is determined if a stop indication has been received. For example, the user may click a link on the displayed web page, enter a new URL, close the browser, change behavior, or a predetermined time out period may expire, etc. to indicate that he/she has completed a review of the displayed page or has selected an organic result or ad placed on the results page. The process 200 then ends. In some implementations, the process 200 may loop back to 204 upon receiving another page request or new content in the browser to perform additional mouse movement data gathering.

Figure 3:
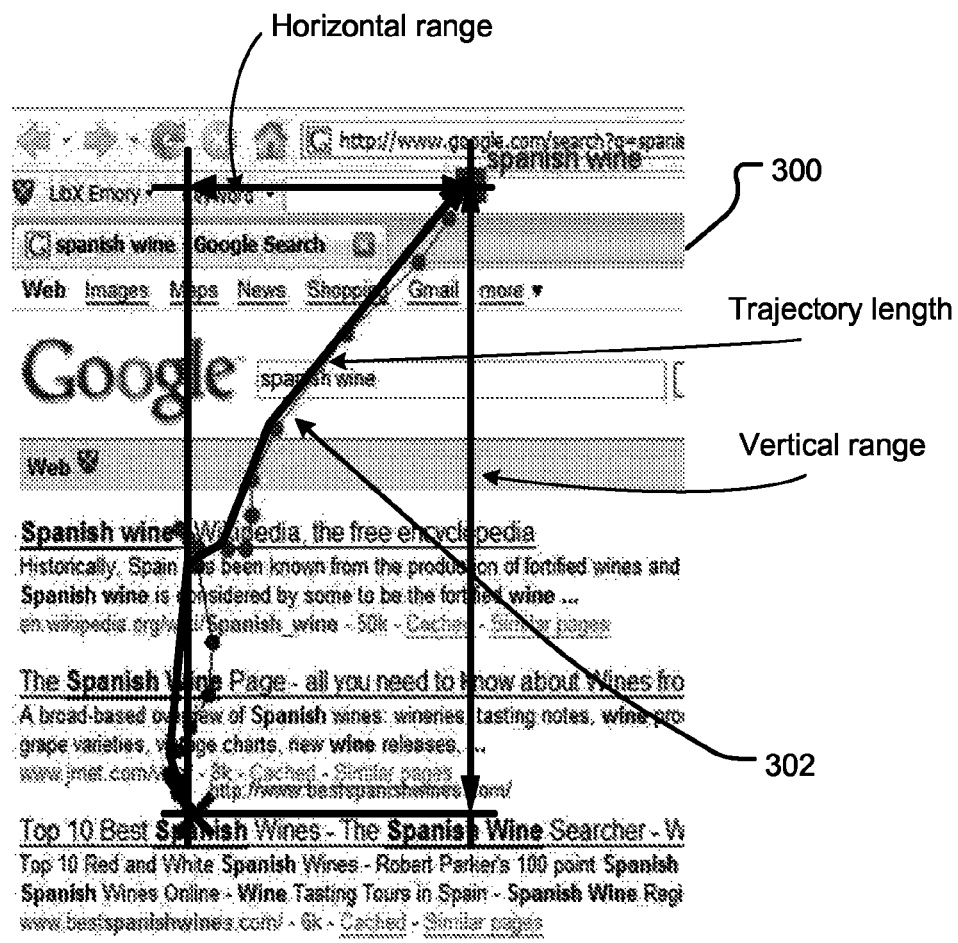
FIG. 3 illustrates an example search results page and mouse movements within the page.

In some implementations, to utilize mouse movement data to determine or infer user intent, training data may be developed by randomly sampling known query instances made to a search engine, such as the GOOGLE search engine. Using the process 200, or similar to ascertain mouse movement, a first representation of mouse movement data may be ascertained. As shown in FIG. 3, for a search results page 300, mouse movements with the page 300 may have a trajectory 302. The trajectory has a horizontal range, a vertical range and a trajectory length that may be sampled.

The queries made to the search engine may be manually classified as, e.g., either navigational or informational. User initiated mouse movements associated with viewing the query results may be correlated into trajectories. Statistics for a sample set of trajectories are shown in Table 1, where is it shown that the average trajectory length of navigational queries is shorter than that of informational queries. The average vertical range of the informational queries is larger, while their horizontal range is relatively smaller than that of navigational queries. Thus, it may be concluded that for navigational queries, users often go directly to the interested result (spending little time on reading the page), whereas for informational queries, users spend more time reading the result page (which results in longer and more complex mouse trajectories).

TABLE 1

| Type | Navigational | Informational |
|---|---|---|
| Average trajectory length (px) | 738 ($\sigma$ = 325) | 1,297 ($\sigma$ = 1,162) |
| Average vertical range (px) | 253 ($\sigma$ = 77) | 374 ($\sigma$ = 177) |
| Average horizontal range (px) | 552 ($\sigma$ = 228) | 526 ($\sigma$ = 244) |

From this information, training data may be developed to seed a machine learning classification system with data about navigational and informational queries such that automatic classification may be performed using mouse movements.

Figure 4A:
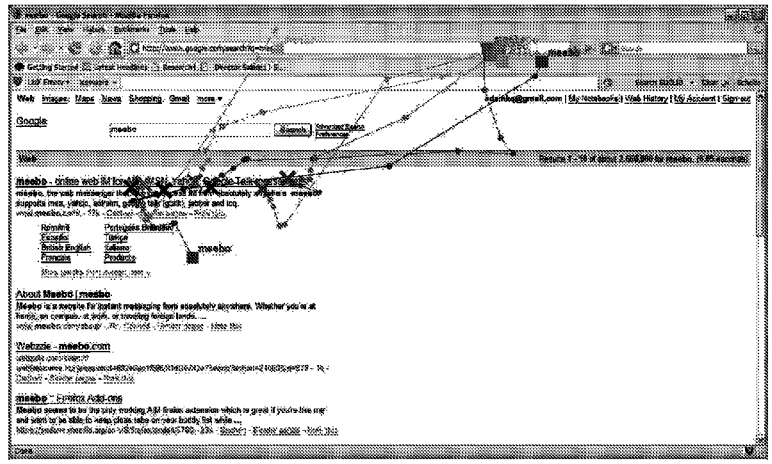
FIGS. 4A-4B illustrate example mouse trajectories for navigational queries.
Figure 4B:
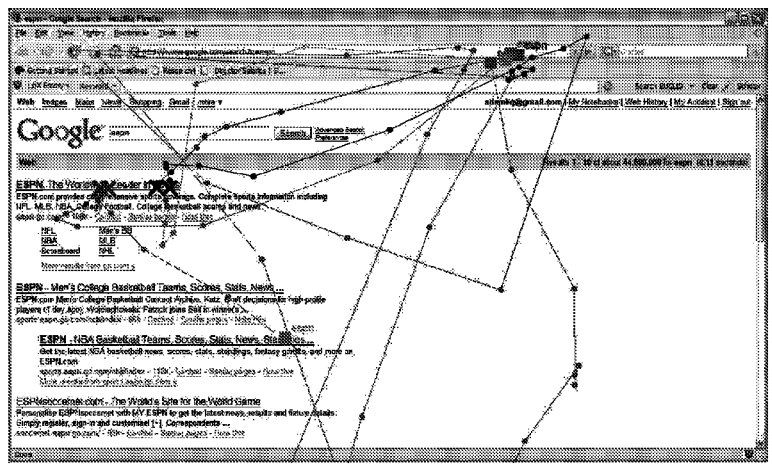

FIGS. 4A-4B illustrate mouse trajectories for two navigational queries for multiple users. Note that while queries for "meebo" (FIG. 4A) follow a relatively consistent pattern, whereas the queries for "espn" (FIG. 4B) exhibit a more complex behavior. This suggests that some queries that are commonly considered navigational (and may exhibit similar click patterns), actually result in quite different user behavior and result examination patterns.

Figure 5A:
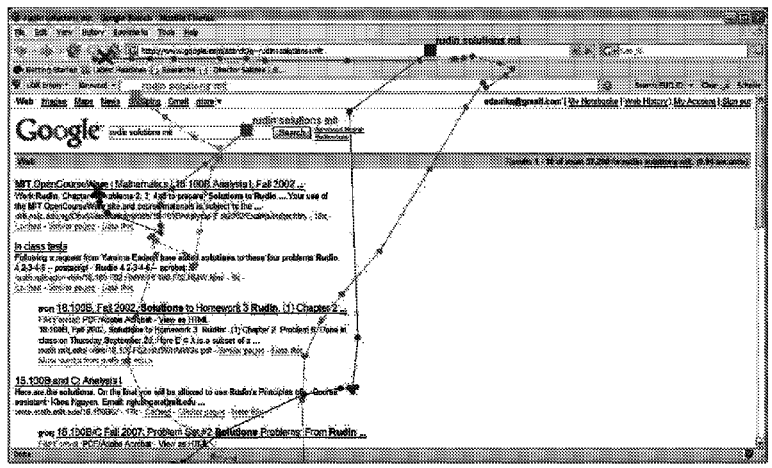
FIGS. 5A-5B illustrate example mouse trajectories for informational queries.
Figure 5B:
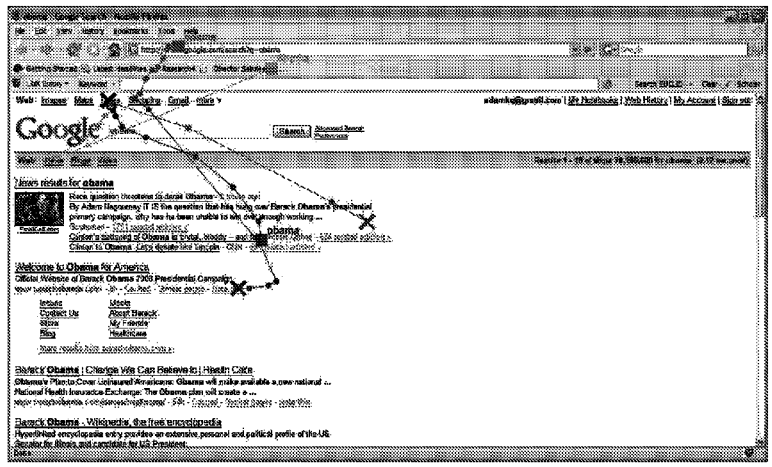

FIGS. 5A-5B illustrate mouse trajectories for different users for two informational queries: "rudin solutions mit" (FIG. 5A) and "obama" (FIG. 5B). Note that while patterns for the first query are relatively consistent, indicating that users are examining multiple results before clicking, the query "obama" is actually both informational and navigational, i.e., exhibiting mouse trajectory patterns of both types of queries for different users. Thus, for queries with multiple possible intents (e.g., navigational and informational for query "obama"), mouse trajectories may disambiguate the intent.

Figure 6:
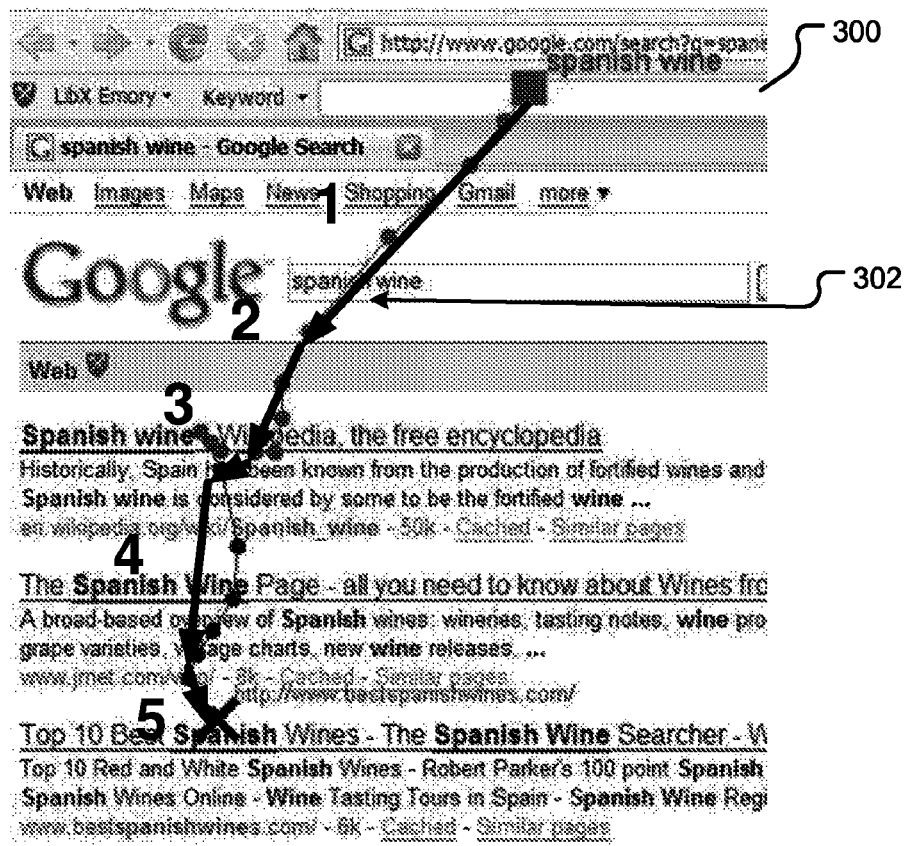
FIG. 6 illustrates different stages of a mouse trajectory within the search results page

Additionally or alternatively, a second representation of the mouse movements may be ascertained. As shown in FIG. 6, to distinguish the patterns in different stages of the user interactions with the search results, the mouse trajectory 302 within the search results page 300 may be broken into five stages: an initial stage (segment 1), an early stage (segment 2), a middle stage (segment 3), a late stage (segment 4), and an end stage (segment 5). Information such as speed, acceleration, rotation and other precise characteristics of the mouse movements may be used to infer intent.

Each of the five segments may contain 20% of the sample points of the trajectories 302. Other percentages may be applied to each of the segments. Then, for each segment of the mouse trajectory the average speed, average acceleration, slope and the rotation angle between the current segment and the segment connecting the beginning and the end (the click position) of the trajectories may be determined. The non-exhaustive, non-limiting list of feature types is shown below in Table 2.

TABLE 2

| Feature | Specification |
|---|---|
| TrajectoryLength | Trajectory length |
| VerticalRange | Vertical range |
| HorizontalRange | Horizontal range |
| Seg. AvgSpeed | Time elapsed between endpoints |
| Seg. AvgAcceleration | Velocity change from previous to current segment |
| Seg. Slope | Vertical range/horizontal range |
| Seg. RotationAngle | The angle between previous and current segment vectors |

In addition, the features may include more explicit features such as "mouse over ads" or "mouse over organic results" which would be helpful in determining intent. In a sample set of data containing commercial and non-commercial queries, such features may capture a user's commercial or non-commercial interest in a fine-grained manner (e.g., a user moves the mouse towards her interested ads without hovering the mouse over them). The sample set also provides an understanding of the contribution of the features identified in Table 2. For example, Table 3 shows the information gain of each feature. As shown, the more relevant features include trajectory length, vertical and horizontal range, and different aspects of mouse trajectories (e.g., rotation, slope, speed) in the initial and end stages.

TABLE 3

| Information Gain | Feature |
|---|---|
| 0.305 | RotationAngle (segment 5) |
| 0.2273 | Slope (segment 5) |
| 0.1996 | Slope (segment 1) |
| 0.196 | TrajectoryLength |
| 0.1848 | RotationAngle (segment 1) |
| 0.1601 | VerticalRange |
| 0.1436 | HorizontalRange |
| 0.1037 | AvgSpeed (segment 5) |
| 0.0708 | AvgSpeed (segment 1) |
| 0.0678 | RotationAngle (segment 2) |

In some implementations, training data or manual labeling may not be used to seed knowledge of the classification engine 114. Rather, certain assumptions may be made about the user's intent (e.g., all searches are non-commercial, all searches are informational, etc.) and using machine-learning techniques and feedback, classification and refinements of classification of user intent may be performed by the classification engine 114, as described below.

Figure 7:
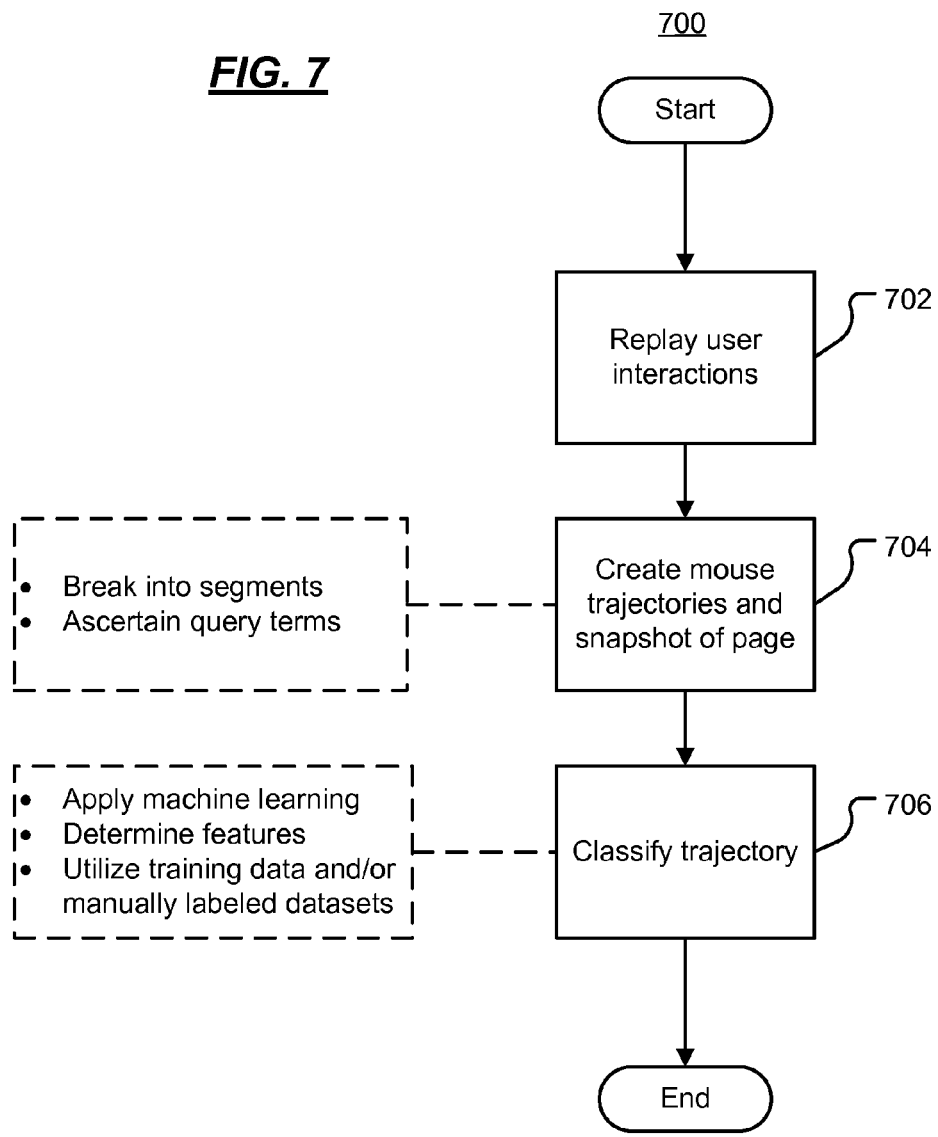
FIG. 7 illustrates an operational flow of a process to analyze mouse movements in a search results page to determine intent.

Referring to FIG. 7 there is illustrated an operational flow of a process 700 to analyze mouse movements in a search results page to determine intent. At 702, the user interactions are replayed. To classify query intent, the user interactions with the web page 300 are "replayed" against the results for user query. At 704, the replayed events are used to create the corresponding mouse trajectories 302 and query terms on a snapshot of the result page.

At 706, the trajectory is classified. Using identified features, the trajectories (interactions) may be represented as feature vectors to which machine learning/classification methods may be used to classify query instances according to user intent. The input data provided to the machine-learning algorithm may be provided as a feature vector from each event on the trajectory 302, and the feature vector may be constructed from several different features (e.g., the features identified in Table 2) or segments of the trajectory data.

In some implementations, conventional machine learning classification techniques may be used at 706. For example, a Weka2 implementation of the Support Vector Machines (called SMO) may be used. Alternatively, the classification may be performed using decision trees. Using standard Information Retrieval (IR) and classification metrics, several methods of classification may be defined. A first is a naive baseline, where the initial guess by the classification engine 114 is the majority class (i.e., non-commercial). A second method is classification using a Support Vector Machine (SVM) trained using the sample set of described above with regard to commercial/non-commercial queries. A third is a trained SVM, as noted above, that is tuned by using the Weka.SMO default parameters with the exception of: "NormalizedPolyKernel-C 250007-E 2.0".

Thus, the processes of FIGS. 2 and 7 may be used to capture mouse movements and determine or infer commercial query intent from the captured mouse movements, respectively. Mouse movements may be used to classify query intent into commercial and non-commercial classes. From the mouse movement trajectories, commercial queries may be determined even though an ad is not clicked by the user (i.e., users are likely to perform a wider horizontal range of mouse movements to hover over the ads).

Figure 8:
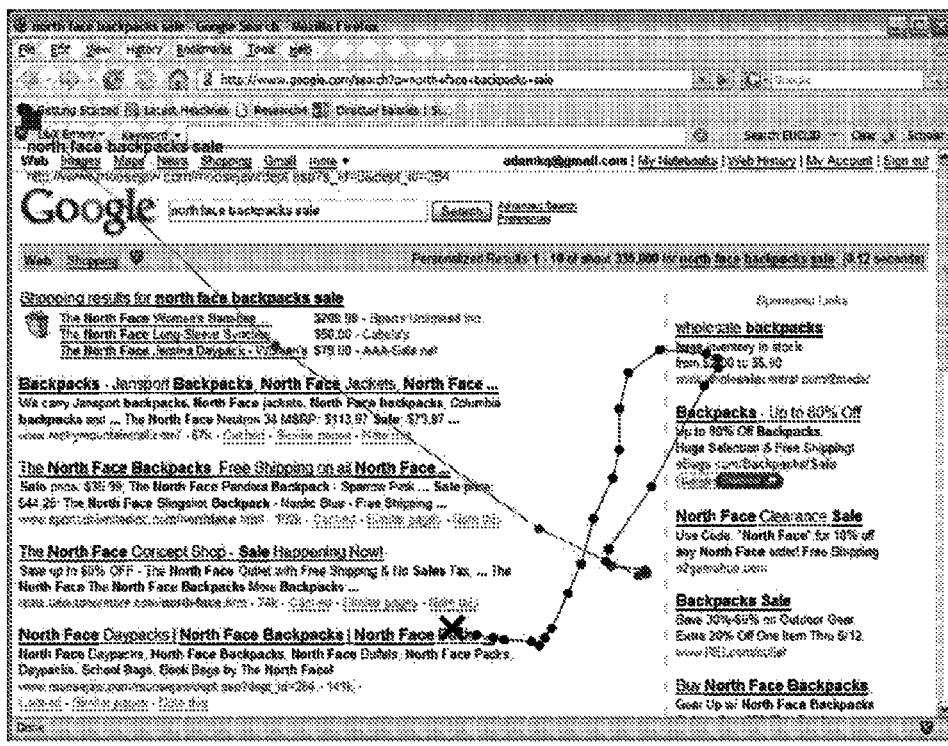
FIG. 8 illustrates an example results page and mouse movements associated with commercial intent.

For example, as shown in FIG. 8, the user query was "north face backpacks sale." The results of that query are show in FIG. 8 with ads displayed on the right-hand side and organic results on the left-hand side. The user moved the mouse to hover over the ads, but later noticed a satisfactory result in the list of organic results. Thus, from the features associated with the mouse trajectory, it may be concluded that the user had commercial intent and that the ads were relevant to the user intent.

Figure 9:
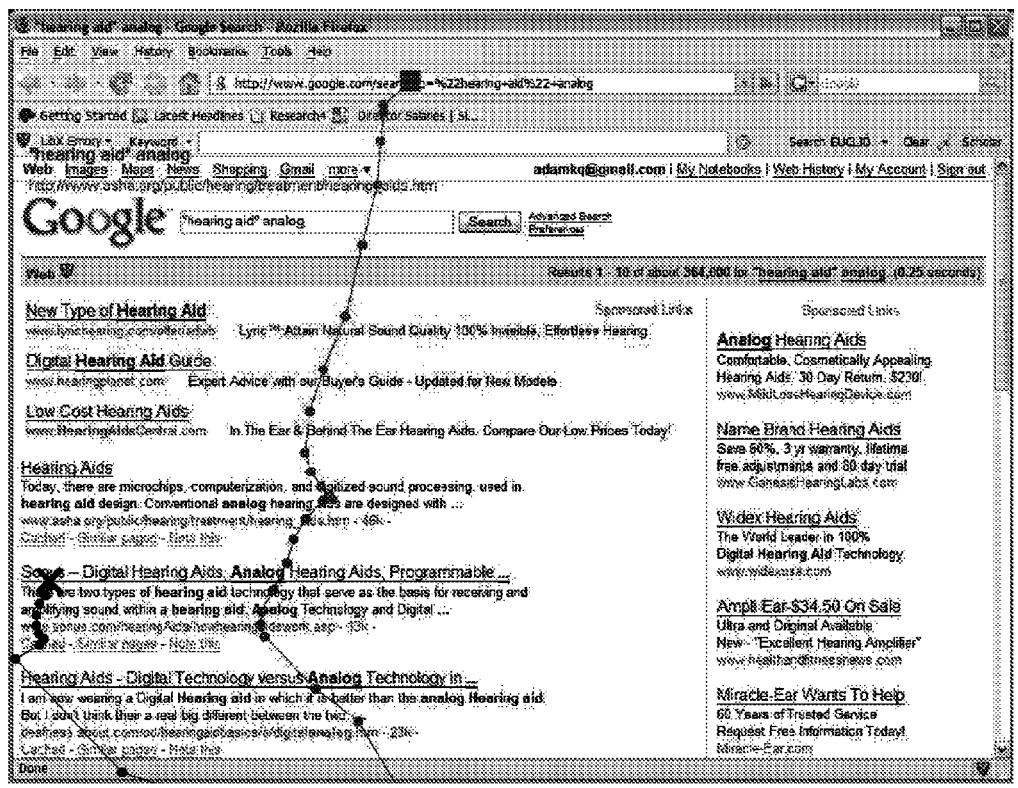
FIG. 9 illustrates an example results page and mouse movements associated with non-commercial intent.

As shown in FIG. 9, the user query was "'hearing aid' analog." The first organic result was satisfactory to the user. The query was information in nature (non-commercial). The features associated with mouse trajectory shown in FIG. 9 would lead to a classification of a non-commercial intent. Here, it may be beneficial not to provide ads at all in the results display.

Additional information is included in the context (session) information of the user. That is, a model may be developed that captures both the behavior over a particular search result page, but also includes behavior from previous search pages within the session, by means of graphical models. Specific implementations may include the Conditional Random Field (CRF) or hierarchical Naïve Bayes model to represent both actions on a page and transitions between searches within a session.

An example implementation using contextualized interaction mining, as outlined above, is to predict the user interest in advertising for future searches within the session. That is, our system can be used to predict future clicks on ad search results.

Figure 10:
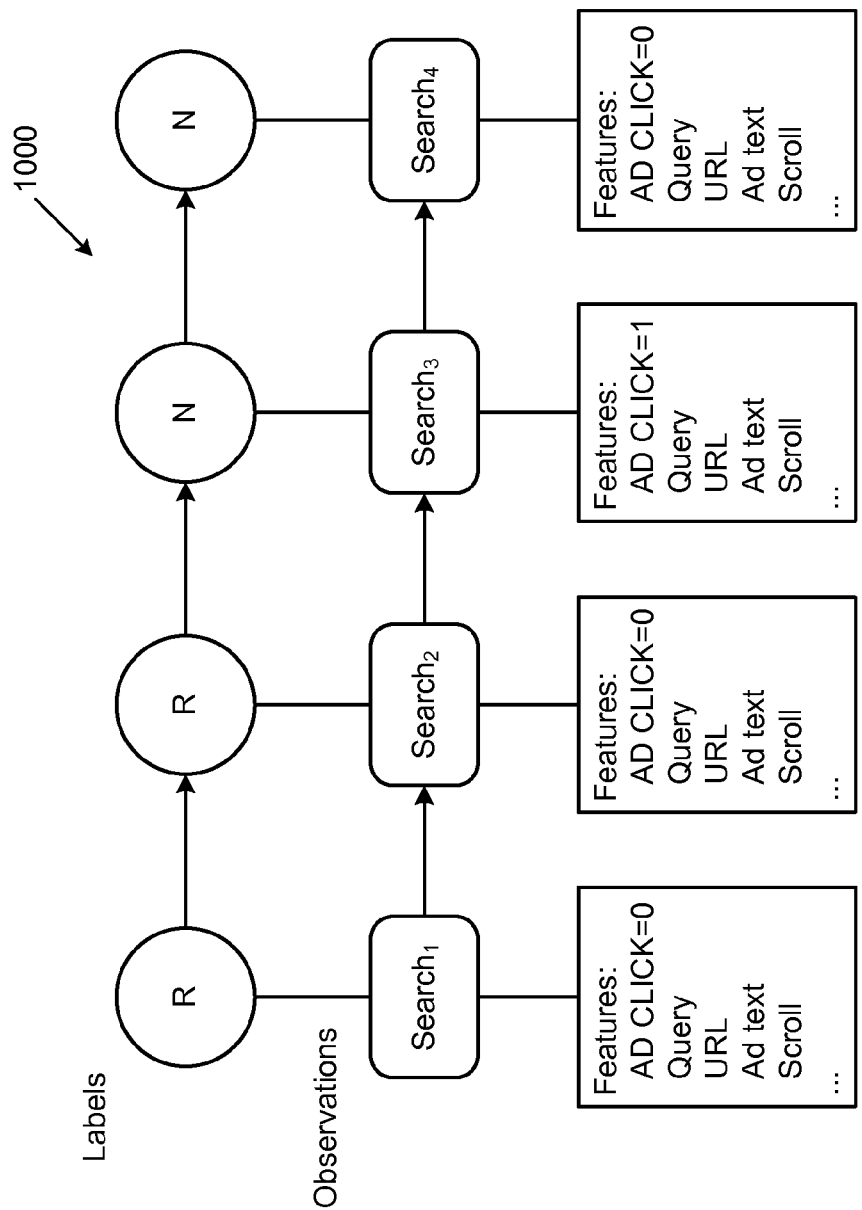
FIG. 10 shows a graphical model where the user intent is modeled as a hidden state.

As another example implementation, the method could be used to predict whether to include search advertising on the search results pages for the current user based on the inferred intent. The corresponding graphical model 1000 is shown in FIG. 10 where the user intent is modeled as a hidden state (e.g., R for receptive to advertising and N is for non-receptive). The system then would predict the appropriate hidden state to represent the users' state of mind, which can in turn be used to better target the search advertising.

The results of accuracy tests of one particular implementation of this idea are shown below in Table 4. The first row, QC, corresponds to a previous state-of-the-art prediction method "Query Chains", that does not consider client-side behavior. The remaining rows in the table, in particular Cxl (C) and Cxl (C+1) correspond to different variants that exhibit accuracy improvements over previous methods represented by rows QC, QCLK, and PC:

TABLE 4

| Method | Precision | Recall | F1 |
|---|---|---|---|
| QC | 0.045 (−) | 0.358 (−) | 0.079 (−) |
| QCLK | 0.075 (+67%) | 0.150 (−58%) | 0.100 (+27%) |
| PC | 0.01 (+80%) | 0.117 (−67%) | 0.096 (+22%) |
| Cxl (C) | 0.199 (+342%) | 0.100 (−72%) | 0.133 (+68%) |
| Cxl (C + 1) | 0.207 (+360%) | 0.124 (−65%) | 0.155 (+96%) |

Figure 11:
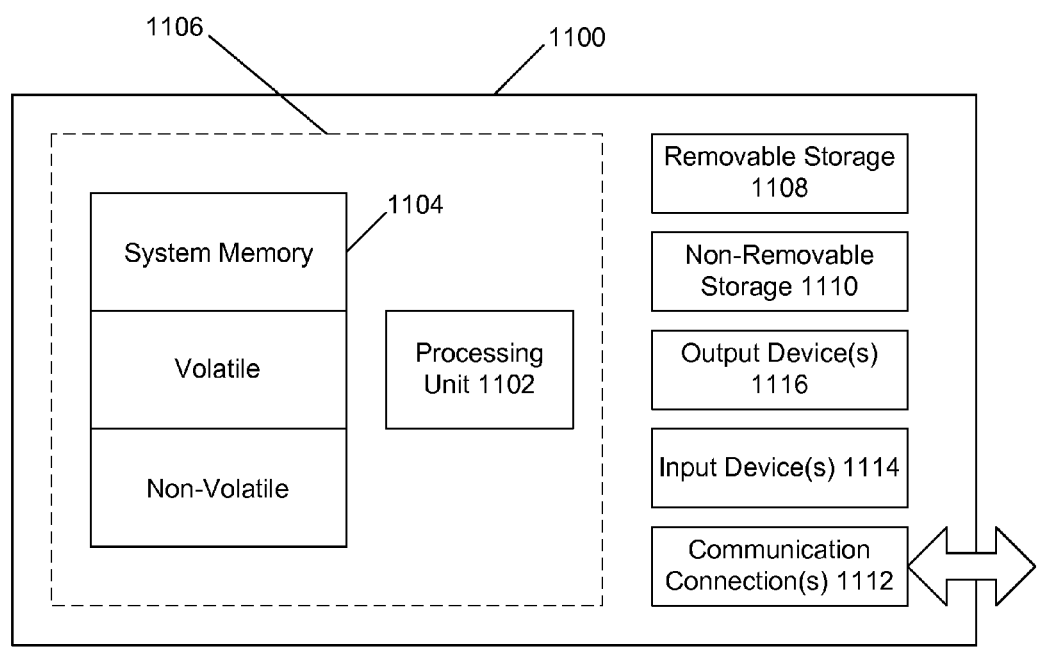
FIG. 11 shows an exemplary computing environment in which aspects of the present disclosure may be implemented.

FIG. 11 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, PCs, server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules being executed by a computer, may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 11, an exemplary system for implementing aspects described herein includes a computing device, such as computing device 1100. In its most basic configuration, computing device 1100 typically includes at least one processing unit 1102 and system memory 1104. Depending on the exact configuration and type of computing device, system memory 1104 may be volatile (such as random access memory (RAM)), non-volatile (such as read-only memory (ROM), flash memory, etc.), or some combination of the two. This most basic configuration is illustrated in FIG. 11 by dashed line 1106.

Computing device 1100 may have additional features and/or functionality. For example, computing device 1100 may include additional storage (removable and/or non-removable)

including, but not limited to, magnetic or optical disks or tape. Such additional storage is illustrated in FIG. 11 by removable storage 1108 and non-removable storage 1110.

Computing device 1100 typically includes a variety of computer-readable media. Computer-readable media can be any available media that can be accessed by computing device 1100 and include both volatile and non-volatile media, and removable and non-removable media. By way of example, and not limitation, computer-readable media may comprise computer storage media and communication media.

Computer storage media include volatile and non-volatile, and removable and non-removable media implemented in any method or technology for storage of information such as computer-readable instructions, data structures, program modules or other data. System memory 1104, removable storage 1108, and non-removable storage 1110 are all examples of computer storage media. Computer storage media include, but are not limited to, RAM, ROM, Electrically Erasable Programmable Read-Only Memory (EE-PROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1100. Any such computer storage media may be part of computing device 1100.

Computing device 1100 may also contain communication connection(s) 1112 that allow the computing device 1100 to communicate with other devices. Communication connection(s) 1112 is an example of communication media. Communication media typically embody computer-readable instructions, data structures, program modules, or other data in a modulated data signal such as a carrier wave or other transport mechanism, and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media. The term computer-readable media as used herein includes both storage media and communication media.

Computing device 1100 may also have input device(s) 1114 such as a keyboard, mouse, pen, voice input device, touch input device, etc. Output device(s) 1116 such as a display, speakers, printer, etc. may also be included. All these devices are well known in the art and need not be discussed at length here.

Computing device 1100 may be one of a plurality of computing devices 1100 inter-connected by a network. As may be appreciated, the network may be any appropriate network, each computing device 1100 may be connected thereto by way of communication connection(s) 1112 in any appropriate manner, and each computing device 1100 may communicate with one or more of the other computing devices 1100 in the network in any appropriate manner. For example, the network may be a wired or wireless network within an organization or home or the like, and may include a direct or indirect coupling to an external network such as the Internet or the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method for inferring user intent associated with an interacting in a user interface, comprising:
    capturing mouse movements in the user interface using a client-side application;
    aggregating captured mouse movements into a mouse trajectory;
    determining a discrete feature representation of the mouse trajectory;
    determining at least one feature of the mouse trajectory, the determining including:
        determining at least one of a mouse trajectory length, a horizontal range of the mouse trajectory, or a vertical range of the mouse trajectory;
        splitting the mouse trajectory into segments; and
        for each segment, determining at least one of an average speed, an average acceleration, a slope or a rotation angle between each segment;
    representing session-level context;
    incorporating context representation into intent prediction; and
    classifying user intent of a human user into a category based on information ascertained from the session-level context and interaction features that includes the at least one feature of the mouse trajectory.

2. The method of claim 1, capturing mouse movements in the user interface further comprising:
    loading a JavaScript application;
    monitoring at least one of mouse movement, mouse presses, scrolling, or other interface events;

adding a coordinate position of a mouse pointer location to a string at an occurrence of predetermined interface events; encoding event sequence as a string to be stored; and processing, parsing, and predicting by a classification engine values of the features.

3. The method of claim 1, further comprising incorporating the session-level context including previous searches in a session and page content representation.

4. The method of claim 3, wherein the page content representation includes at least one of words on a search result page, words in the previous query, or interactions on a search result page.

5. The method of claim 1, further comprising classifying the user intent using a machine learning classification technique, the machine learning classification technique comprising one of a Conditional Random Field (CRF), a Support Vector Machine (SVM), or a Decision Tree.

6. The method of claim 5, further comprising:
developing training set data; and
tuning the machine learning classification technique using the training set data.

7. The method of claim 6, wherein the training set data is developed to correlate features to probable user intents.

8. The method of claim 1, further comprising classifying user intent as either commercial or non-commercial.

9. A system for determining user intent, comprising:
at least one processor, and
at least one memory including computer program code for one or more programs;
a client-side mouse movement capture application that captures mouse movements in a user interface in accordance with received events; and
a classification engine that receives the mouse movements and determines a mouse trajectory, the classification engine determining features of the mouse trajectory that are used to classify user intent of a human user into predetermined categories;
wherein the classification engine splits the mouse trajectory into segments; and
wherein for each segment, the classification engine determines at least one of an average speed, an average acceleration, a slope or a rotation angle between each segment.

10. The system of claim 9, wherein the client-side mouse movement application comprises a JavaScript application that monitors interface events, and wherein a coordinate position associated with a predetermined event are encoded in a string that is communicated to the classification engine.

11. The system of claim 9, wherein the features include at least one of a mouse trajectory length, a horizontal range of the mouse trajectory, or a vertical range of the mouse trajectory.

12. The system of claim 9, wherein the classification engine utilizes a machine learning classification technique, and wherein the machine learning classification technique is tuned using training set data developed to correlate features to probable user intents.

13. The system of claim 9, wherein user intent is classified as either commercial or non-commercial.

14. A method of classifying user intent in accordance with features of mouse movements, comprising:
receiving mouse movement data associated with the mouse movements;
aggregating the mouse movement data into a mouse trajectory;
splitting the mouse trajectory into segments;
determining features of the mouse trajectory and the segments, the determining the features including for each segment, determining at least one of an average speed, an average acceleration, a slope or a rotation angle between each segment; and
classifying user intent of a human user into a category in accordance with information determined from the features.

15. The method of claim 14, further comprising determining at least one of a mouse trajectory length, a horizontal range of the mouse trajectory, or a vertical range of the mouse trajectory.

16. The method of claim 14, further comprising classifying the user intent using a machine learning classification technique.

17. The method of claim 16, further comprising tuning the machine learning classification technique using training set data developed to correlate the features to probable user intents.

* * * * *